United States Patent
Woodman et al.

(10) Patent No.: US 9,259,652 B2
(45) Date of Patent: Feb. 16, 2016

(54) TIME-SHIFTED MULTIPLAYER GAME

(71) Applicant: Electronic Arts, Inc., Redwood Shores, CA (US)

(72) Inventors: Kynan Woodman, South Melbourne (AU); Ian Uniacke, Melton South (AU)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 13/787,562

(22) Filed: Mar. 6, 2013

(65) Prior Publication Data

US 2014/0256447 A1  Sep. 11, 2014

(51) Int. Cl.
| | |
|---|---|
| *A63F 9/24* | (2006.01) |
| *A63F 13/44* | (2014.01) |
| *A63F 13/497* | (2014.01) |
| *A63F 13/67* | (2014.01) |

(52) U.S. Cl.
CPC .............. *A63F 13/44* (2014.09); *A63F 13/497* (2014.09); *A63F 13/67* (2014.09)

(58) Field of Classification Search
CPC ........... A63F 9/24; A63F 13/00; A63F 13/13; A63F 2300/24; A63F 2300/63; A63F 2300/558; A63F 2300/6027; A63F 2300/6045; A63F 2300/6054; A63F 2300/634; A63F 2300/636; A63F 2300/638; A63F 2300/64; A63F 2300/8017; A63F 2300/5533
USPC .............................. 463/4, 6, 23, 59, 60, 63, 64
See application file for complete search history.

(56) References Cited

U.S. PATENT DOCUMENTS

| | | | |
|---|---|---|---|
| 2004/0266506 A1* | 12/2004 | Herbrich et al. | 463/6 |
| 2004/0266566 A1* | 12/2004 | Shiang et al. | 473/457 |
| 2005/0130725 A1* | 6/2005 | Creamer et al. | 463/1 |
| 2006/0223041 A1* | 10/2006 | Beck et al. | 434/307 R |
| 2006/0246972 A1* | 11/2006 | Thomas et al. | 463/4 |
| 2007/0060359 A1* | 3/2007 | Smith | 463/42 |
| 2008/0167122 A1* | 7/2008 | Maeda et al. | 463/30 |
| 2009/0102847 A1* | 4/2009 | Yabuki et al. | 345/440 |
| 2010/0113115 A1* | 5/2010 | Hightower | 463/6 |
| 2011/0281638 A1* | 11/2011 | Bansi et al. | 463/23 |
| 2012/0010734 A1* | 1/2012 | Youm | 700/92 |
| 2013/0084969 A1* | 4/2013 | Knoles et al. | 463/29 |

* cited by examiner

*Primary Examiner* — James S McClellan
*Assistant Examiner* — Kevin Carter
(74) *Attorney, Agent, or Firm* — Lowenstein Sandler LLP

(57) ABSTRACT

In one embodiment, a method provides a game for a first player. The method receives timing information for a second player that competed in a first instance of the game participated in by the second player and determines a set of parameters for an opponent in a second instance of the game based on the timing information. The second player started competing in the first instance of the game before the second instance of the game is started. Then, the opponent is created based on the set of parameters for the second instance of the game. After which, the method provides the second instance of the game in which the first player competes with the opponent. The opponent is automatically controlled in the second instance of the game by a game controller to perform according to the set of parameters.

13 Claims, 7 Drawing Sheets

| Car | Skill | Time |
|---|---|---|
| Car #1 | 20 | 10:00 |
| Car #2 | 40 | 8:00 |
| Car #3 | 65 | 6:30 |
| Car #4 | 80 | 4:00 |

| Car | Skill | Time |
|---|---|---|
| Car #1 | 20 | 10:00 |
| Car #2 | 40 | 8:00 |
| Car #3 | 65 | 6:30 |
| Car #4 | 80 | 4:00 |

300-1

Performance Level = 80

| Car | Skill | Time |
|---|---|---|
| Car #1 | 20 | 8:00 |
| Car #2 | 40 | 6:00 |
| Car #3 | 65 | 4:30 |
| Car #4 | 80 | 2:00 |

300-2

Performance Level = 90

FIG. 4

TIME-SHIFTED MULTIPLAYER GAME

BACKGROUND

In games, such as racing games, a player competes against other opponents. For example, in a single player game, a player may race a car against opponents' cars that are controlled by artificial intelligence (AI). The AI-controlled cars are automatically controlled during the race according to pre-set specifications. During the game, the player attempts to beat the AI-controlled cars to record the fastest time possible.

In another type of game, referred to as a real-time multiplayer game, a player competes with other live players. Real-time multiplayer games may increase the interest in the game as competing against a real-life person may be more entertaining than competing against just AI-controlled opponents. Additionally, players may connect with friends and compete against the friends. Providing the chance to compete against friends may further increase the interest and also cause a player to play the game more and for longer times. However, there are times when a player's friends are not online at the same time as the player. Thus, the player can decide to play with random people or may play a game in which only AI-controlled opponents participate. In some cases, when faced with this scenario, a player might not be as interested in the game or may decide not to play the game.

SUMMARY

In one embodiment, a method provides a game for a first player. The method receives timing information for a second player that competed in a first instance of the game participated in by the second player and determines a set of parameters for an opponent in a second instance of the game based on the timing information. The second player started competing in the first instance of the game before the second instance of the game is started. Then, the opponent is created based on the set of parameters for the second instance of the game. After which, the method provides the second instance of the game in which the first player competes with the opponent. The opponent is automatically controlled in the second instance of the game by a game controller to perform according to the set of parameters.

In one embodiment, a method for providing a game for a first player includes: receiving, by a computing device, a second player's time for completing a race using a first racing entity in a first instance of a racing game participated in by the second player; mapping, by the computing device, the second player's time to a skill level for a second racing entity in a second instance of the racing game based on a mapping table of skill levels to predicted times for opponents in the race, wherein the first instance of the racing game is completed by the second player before the second instance of the racing game is started; creating, by the computing device, the second racing entity for the second instance of the racing game based on the skill level; and providing, by the computing device, the second instance of the racing game in which the first player races a third racing entity that competes with the second racing entity, wherein the second racing entity is automatically controlled in the second instance of the racing game by a game controller to perform according to the skill level.

In one embodiment, an apparatus includes: one or more computer processors; and a non-transitory computer-readable storage medium comprising instructions, that when executed, control the one or more computer processors to be configured for: receiving timing information for a second player that competed in a first instance of the game participated in by the second player; determining a set of parameters for an opponent in a second instance of the game based on the timing information, wherein the second player started competing in the first instance of the game before the second instance of the game is started; creating the opponent based on the set of parameters for the second instance of the game; and providing the second instance of the game in which the first player competes with the opponent, wherein the opponent is automatically controlled in the second instance of the game by a game controller to perform according to the set of parameters.

The following detailed description and accompanying drawings provide a better understanding of the nature and advantages of particular embodiments.

BRIEF DESCRIPTION OF THE DRAWINGS

FIG. 3 depicts an example of a mapping table according to one embodiment.

FIG. 4 shows an example of mapping tables that include performance levels according to one embodiment.

DETAILED DESCRIPTION

Described herein are techniques for a time-shifted multiplayer game. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1:
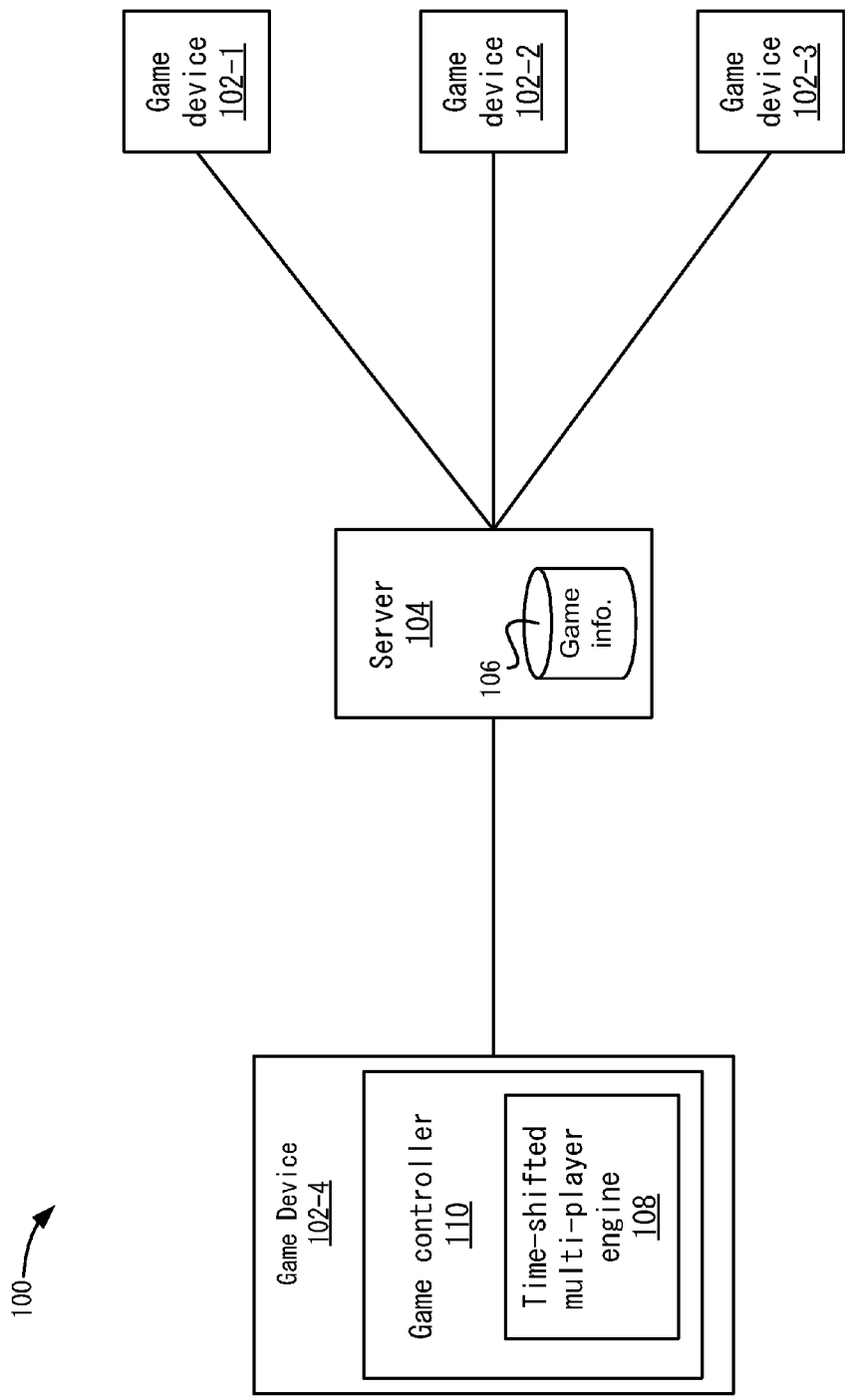
FIG. 1 depicts a simplified system for providing a time-shifted multiplayer game according to one embodiment.

FIG. 1 depicts a simplified system 100 for providing a time-shifted multiplayer game according to one embodiment. System 100 includes game devices 102 and a server 104. Game devices 102 may be computing devices, such as mobile phones, smartphones, tablet computing devices, personal computers, game consoles, and other devices that can provide a game. Server 104 includes a computing device that can communicate with game devices 102 through a network (not shown). Although one instance of server 104 is shown, multiple instances may be used and functionality described with respect to server 104 may be distributed across many servers 104. Each game device 102 may include a game controller 110 that provides the game. For example, game controller 110 may be configured to set up the game and allow a player to play the game. Although game controller 110 is shown in game device 102, functions described with respect to game controller 110 may be distributed across many devices, such as in server 104.

Game devices 102 provide a game that various players can play. The game may be a timed game in which a player competes to receive a time in the game. The time may be when an instance of the game is completed or a portion of the instance of the game is completed. For example, a racing game, such as a car racing game, track and field game, downhill skiing game, or other timed events, allows the player to compete against other opponents. The game may offer various events, such as race courses, in which the player may control a game entity, such as a car, person, player, or other racing entity, around the course. In one example, a player may select various tracks in which the player can then control a car in competing against other opponents. Times are recorded may correspond to a complete race or portions of the race, such as each lap may be timed. When the race is completed, the time the player took to complete the race is recorded.

In one embodiment, the game allows a first player to compete against other players in a time-shifted, multiplayer fashion. For example, a second player may complete a first instance of the game using game device 102-1. In this game, the second player may receive a first time, such as the second player may receive a time of 3 minutes to complete a car race. Server 104 would store the second player's time in storage 106 as "game information". The game information may include the second player's time and other information such as identifying information for the second player (e.g., a user ID), the skill level or performance level, and the type of race.

When a first player wants to then play a second instance of the game, particular embodiments allow the first player to compete in a game in which one of the opponents is configured based on the second player's time (e.g., from the already-completed game). For example, as will be described in more detail below, the time the second player received in the first instance of the game is used to configure an artificial intelligence (AI)-controlled opponent in the second instance of the game. Then, the first player competes against the AI-controlled opponent in the second instance of the game. This gives the first player the simulated experience of playing against the second player as the first player can see the opponent and can race against them in the second instance of the game. Also, the AI-controlled opponent based on the second player can impact the race of the first player, which may lead to a more engaging experience for the first player. Thus, a multiplayer game is provided in a time-shifted manner as the second player is allowed to compete in an instance of a game before the first player competes in another instance of the game.

In one embodiment, a time-shifted multiplayer engine 108 determines when the first player initiates an instance of the game. Time-shifted multiplayer engine 108 may then send a request to server 104 to determine if any possible opponents for the first player have corresponding times for the same game. For example, time-shifted multiplayer engine 108 may determine if any friends of the first player have completed the game. Although friends are discussed, it will be understood that times for friends may include other users, such as random users that the first player does not know.

If there are any friends that have completed the game previously, time-shifted multiplayer engine 108 receives timing information for the friends' times. For discussion purposes, only one friend's time will be discussed, but multiple times may be used to create additional opponents. Time-shifted multiplayer engine 108 uses the received timing information to configure an opponent to compete against the first player in the second instance of the game.

In one embodiment, the AI-controlled opponent is configured with a set of parameters that attempts to control the opponent to perform similarly to how the second player performed in the previous instance of the game. For example, the AI-controlled opponent is controlled to attempt to achieve the same time as the second player. In one example, time-shifted multiplayer engine 108 sets initial conditions for the opponent where the initial conditions are determined to be conditions that may cause the AI-controlled opponent to perform such that a time similar to the second player's time is received. However, because only initial conditions are set and game play may vary (e.g., the opponent may crash), the ultimate time that the AI-controlled opponent receives may vary. In another example, game controller 110 dynamically adjusts characteristics of the game, such as the set of parameters, based on the game play such that the AI-controlled opponent always receives a time similar to (e.g., the same as) the second player's time.

Figure 2A:
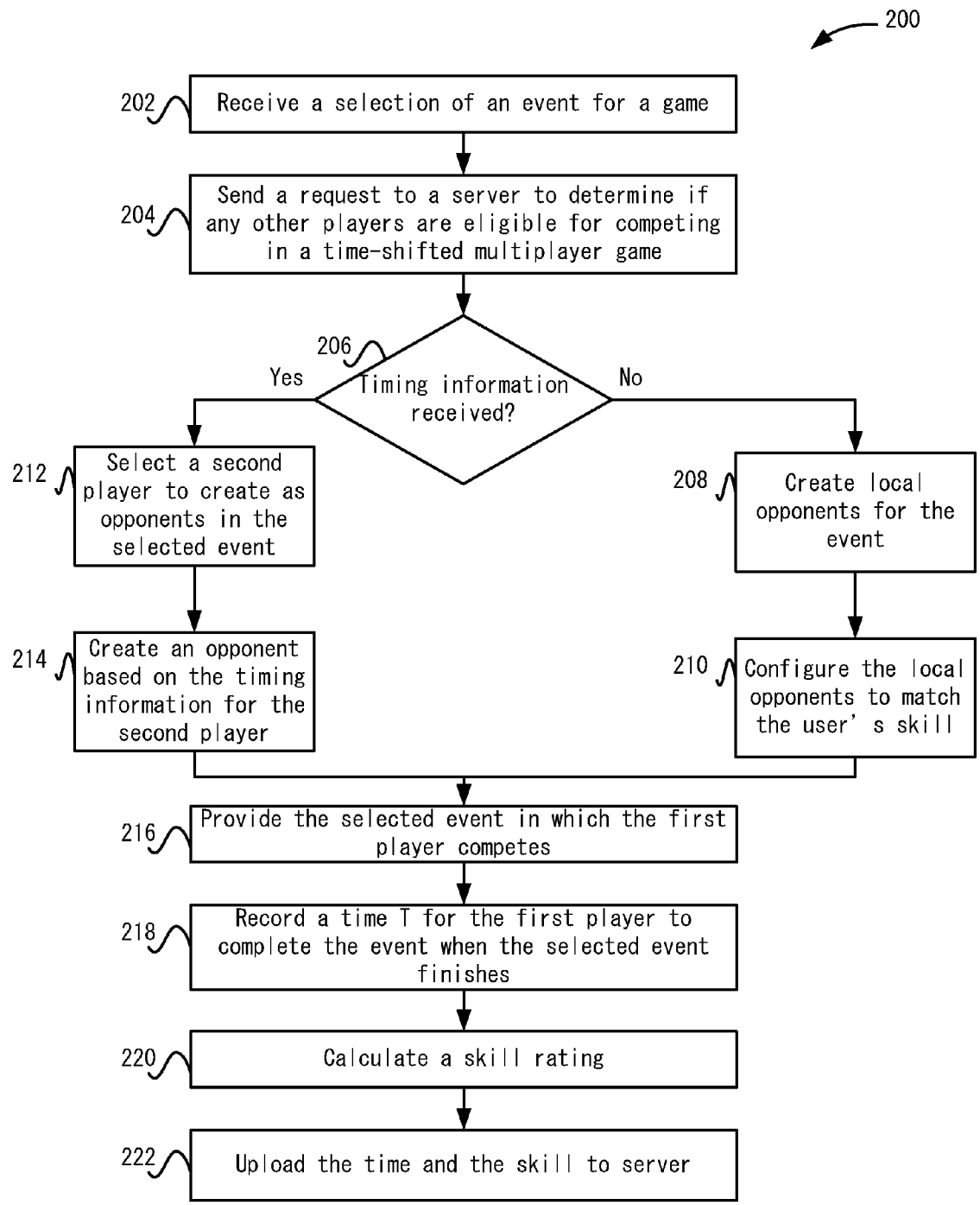
FIG. 2A depicts a simplified flowchart of a method for providing a time-shifted multiplayer game according to one embodiment.

FIG. 2A depicts a simplified flowchart 200 of a method for providing a time-shifted multiplayer game according to one embodiment. At 202, game controller 110 receives a selection of an event for a game. For example, the event may be a type of timed event, such as a racetrack. The event may also include other characteristics, such as a length, number of laps, and number of opponents.

At 204, game controller 110 sends a request to server 104 to determine if any other players are eligible for competing in a time-shifted multiplayer game, such as the request is for friends of the first player. For example, the first player may have a friends' list that lists friends of the first player. In one embodiment, server 104 maintains each player's friends list centrally. When server 104 receives the request, server 104 can retrieve the first player's friends list. In another embodiment, game device 102 sends a friends list for the first player to server 104. In one embodiment, the friends list includes players that have been added as friends by the first player. In other embodiments, players that are not friends may be used, such as randomly selected players or players determined to be of a similar skill level as the first player.

Once determining the friend's list, server 104 may then determine whether any friends of the first player have played the same game. For example, server 104 may determine any friends of the player that have an eligible time. The eligible time may be for a completed game, or may be a time for a portion of a game, such as a lap or multiple laps. Also, the eligible times may be for events that have been completed during a certain time period, such as since the last time the player logged in. Thus, only new times are used. Also, server 104 uses the event selected by the first player to determine a time by a friend that has completed the same event. In this case, the eligible times may be event-specific. If a friend had completed a different event, such as a different racetrack, then that friend's time is not applicable to this request.

At 206, game controller 110 determines if timing information for a second player (e.g., a friend's) was received. If not (e.g., no friends had completed the same event or game device 102 is offline and thus could not connect to server 104), at 208, game controller 110 creates local opponents for the event. For example, game controller 110 creates a number of cars that will race in the same race as the first player.

At 210, game controller 110 configures the local opponents to match the user's skill. For example, the first player may be associated with a certain skill level, such as a rating of how the user has performed previously. In one example, the skill rating may be a value from 0 to 100. Local opponents are set up to be around the user's skill level. For example, if the user's skill level is 60, game controller 110 creates opponents from the 40 to 70 skill range.

Assuming that server 104 determines a friend had completed the event, server 104 sends timing information for the time that the friend received in completing the instance of the game. For example, server 104 sends a time of 3:00 minutes and a user ID for the friend to game controller 110. Server 104 may also send other information, such as possibly a skill rating or performance level for the friend. The skill rating may be a rating of how the friend performs in the game. For example, the friend may take corners tightly on a racetrack or may drive on the grass a lot. The performance level may be a level of performance characteristics in the game, such as a race car may have a certain level of performance, such as a high acceleration, better braking, or a higher top speed.

At 212, time-shifted multiplayer engine 108 selects a second player to create as opponents in the selected event assuming timing information for one or more second player's previous games was received from server 104. For example, in one embodiment, only one friend may be an opponent that is racing the first player in the event. However, the first player may have multiple friends that have previously raced and they may all race in the selected event. For example, a race track may have a possibility of 6 opponents (e.g., 6 opponent cars) and 6 friends may be selected. For discussion purposes, it will be assumed that one friend is selected to compete as an opponent in the selected event.

At 214, time-shifted multiplayer engine 108 creates an opponent based on the timing information for the second player. As was described above and will be described in more detail below, the opponent is created and configured with a set of parameters based on the timing information received for the second player. For example, if the second player had received a time of 3:00 minutes in a previous instance of the game in which the second player completed, then a car that is configured to complete the selected event in 3 minutes is configured. The configuration process of the opponent will be described in more detail below.

At 216, game controller 110 provides the selected event in which the first player competes (either against local opponents and/or with the opponent created based on the second player's time). For example, the first player controls a first car in a race and an opponent based on the second player's time is controlled via AI by game controller 110. The opponent is AI-controlled using the set of parameters that were configured based on the second player's timing information. Also, characteristics of the second player's game may also be used. For example, if the second player drove on the grass a lot in the first instance of the game, the AI controlled opponent may drive on the grass a lot.

At 218, the selected event finishes and game controller 110 records a time T for the first player to complete the event. For example, in a race, the first player controls a first car and when the first player maneuvers the car around the racetrack a number of times to complete the race, game controller 110 records that time.

At 220, game controller 110 calculates a skill rating S. The skill rating may depend on various factors, such as the time T, the configuration of the first player's game entity (e.g., the car and what features the car has), the characteristics of game play (e.g., how well the first player controlled the first car—drove on the grass, crashed, etc.), and the place the first player came in in the event.

At 222, game controller 110 uploads the time T and the skill S to server 104. In this case, the time T and skill S may be used to participate in other time-shifted multiplayer games with other friends of the first player.

Figure 2B:
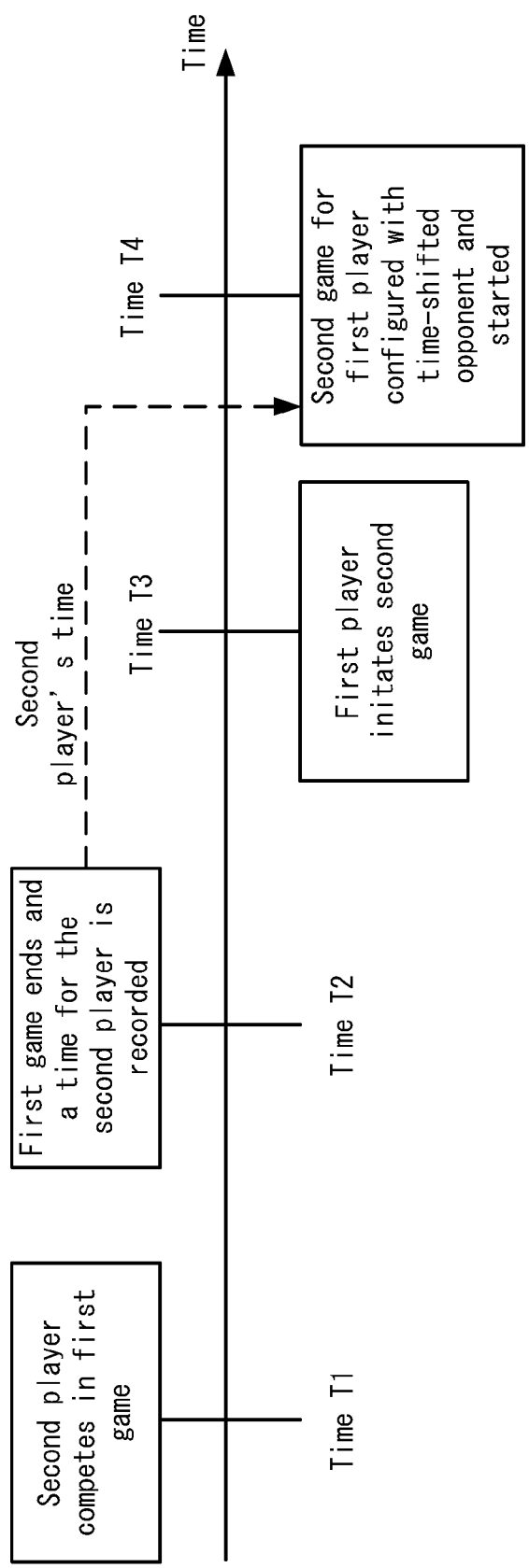
FIG. 2B depicts a timeline for the time-shifted multiplayer game according to one embodiment.

FIG. 2B depicts a timeline for the time-shifted multiplayer game according to one embodiment. As a time T1, the second player competes in the first game. Then, at a time T2, the first game ends and a time for the second player is recorded. At a time T3, the first player initiates the second game. The second game is started after the completion of the first game as is shown. At time T4, the second game is configured with a time-shifted opponent using the first player's time and the game is started. As shown, the first and second games are not played at the same time, but the second game simulates a multiplayer game using the second player's time.

Different methods for mapping timing information for a second player's time received in a previous game to an AI-controlled opponent may be appreciated. Particular embodiments map from the second player's timing information to a set of parameters that will be used to control the opponent. FIG. 3 depicts an example of a mapping table 300 according to one embodiment. Mapping table 300 includes entries for various opponents and the times in which the opponents are predicted to complete an event based on a configured set of parameters. In mapping table 300, the opponents are cars, and the set of parameters includes a skill level. The prediction of the times to complete an event may be determined based on an initial configuration stage. In this case, for an event, such as a specific racetrack, a simulated race with multiple cars of different skill levels may be performed. The times in which the cars complete the race are then recorded. Multiple races may be performed to simulate actual game conditions to predict the times for the various cars. The predicted times are then stored in mapping table 300. The initial configuration stage may be performed before the first and second games are performed.

In table 300, a relationship between skill level and the time received is shown. In one embodiment, the relationship is linear in that as skill level is adjusted up or down, the times adjust up or down, respectively, in response. For example, a car #1 has a skill level of 20 and receives a time of 10:00 minutes, car #2 has a skill level of 40 and receives a time of 8:00 minutes, and so on. As can be seen, as the skill level increases, the times generally decrease. Although a higher skill level may not always result in a lower time in a race, in general, a higher skill level means that a car performs better and most likely results in a lower time. It will be recognized that game play may affect the time, such as a car may crash, which causes the car to receive a higher time. In the initial configuration phase, multiple races may be run to predict an average time for each car of each skill level.

Time-shifted multiplayer engine 108 uses mapping table 300 to interpolate a skill level for an opponent. For example, if the timing information for the second player in the previous game was five minutes, then time-shifted multiplayer engine 108 may use the times for car #3 and car #4 and their respective skill levels to determine a skill level for the opponent. In this case, because the time of 5 minutes is in between the time of 4 minutes and 6:30 minutes and the respective skill levels for car #4 and car #3 are 80 and 65, time-shifted multiplayer engine 108 interpolates that the skill level for the opponent in the present game should be between the range of 65-80. For example, time-shifted multiplayer engine 108 determines the interpolated skill level should be 71 based on a ratio between the predicted times and skill levels. Other methods for interpolating the skill level will also be appreciated.

In one embodiment, a performance level may also be used in addition to the skill level. As described above, the performance level may be based on the type of game entity that is being used in the game. For example, the second player's car that was used in the previous race may have certain features, such as upgrades, that contribute to the performance level. In one example, the second player's car may have a certain level of acceleration, braking ability, or top speed. The performance level for the car depends on aspects of these features. Different performance levels affect the time to complete the race. For example, a car that has a higher acceleration and higher top speed may be more likely to complete a race in a faster time than another car.

In one embodiment, time-shifted multiplayer engine 108 may match the performance level associated with the second player to a performance level in a mapping table. Thus, the skill level and times for cars in the mapping table match the performance level of the second player. FIG. 4 shows an example of mapping tables 300-1 and 300-2 that include performance levels according to one embodiment. Mapping table 300-1 is the same mapping table as depicted in FIG. 3 except that the performance level is defined as being equal to 80. In this case, all the cars in mapping table 300-1 are associated with a performance level of 80. Mapping table 300-2, however, is associated with a performance level of 90. Thus, all cars in mapping table 300-2 are associated with this performance level. As discussed above, a higher performance level means the cars perform at a higher level and thus complete a race with faster times in most cases. As shown in mapping table 300-2, cars #1-#4 have completed the race in faster times than cars #1-#4 in mapping table 300-1 even though the cars have the same respective skill level.

If the second player had a performance level of 90 and completed the race in a time of 5 minutes, then game controller 110 would interpolate between the times and skill levels for car #2 and car #3 in mapping table 300-2. This results in a skill level between the range of 40-65, which is different from the skill level determined above with respect to FIG. 3. That is, if the second player had a better car, but completed the race in the same time, this would indicate that the user would have a lower skill level. Accordingly, the performance level may affect the skill level that time-shifted multiplayer engine 108 determines for the opponent.

Figure 5:
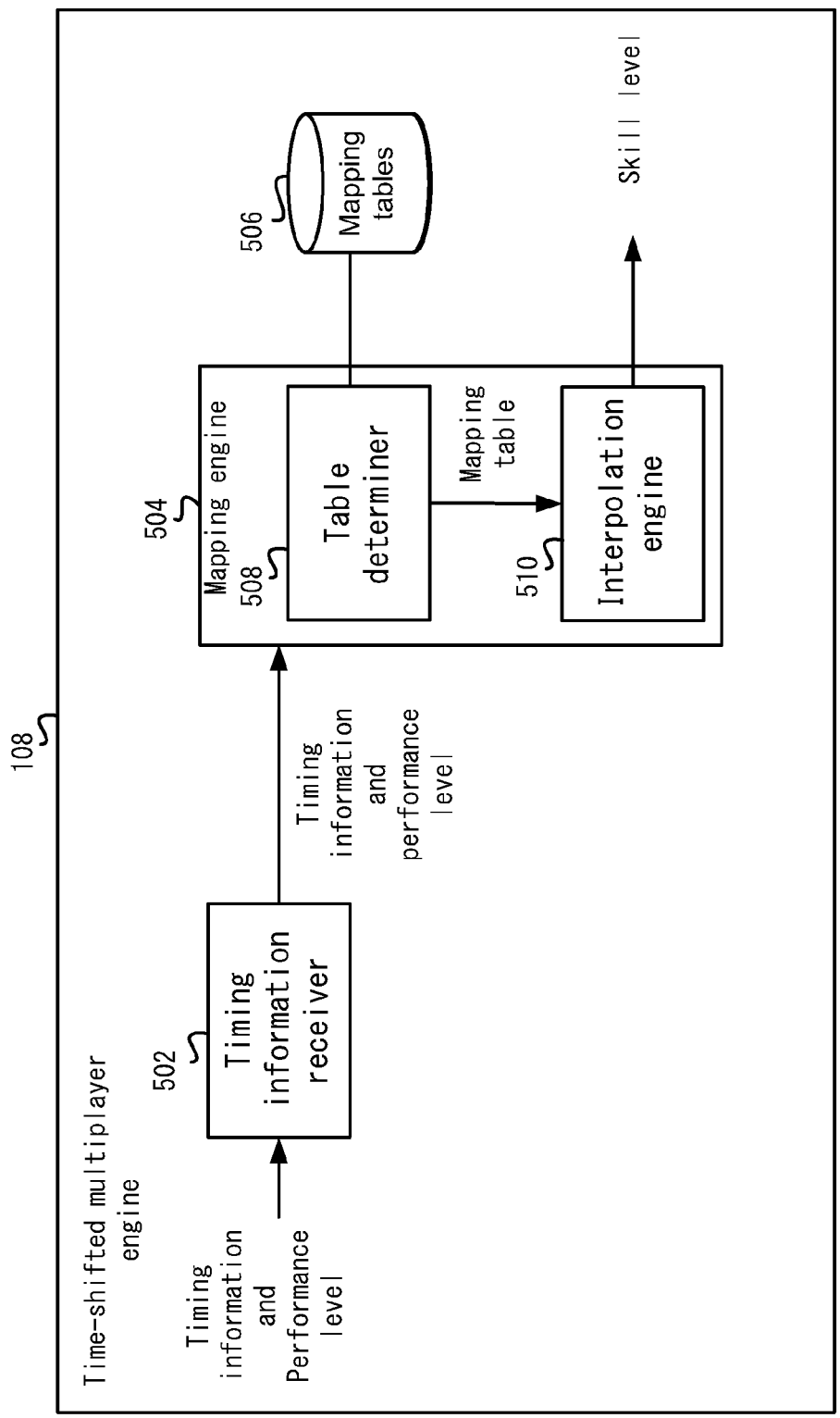
FIG. 5 depicts a more detailed example of time-shifted multiplayer engine according to one embodiment.

FIG. 5 depicts a more detailed example of time-shifted multiplayer engine 108 according to one embodiment. A timing information receiver 502 receives timing information and performance levels for friends of the first player. Timing information receiver 502 may then select one or more of the friends to create as opponents to the first player. When selected, timing information receiver 502 sends the timing information and performance level to a mapping engine 504. Mapping engine 504 may access a mapping table in storage 506 depending on the performance level received. For example, a table determiner 508 takes the performance level and determines a mapping table in storage 506. Although mapping tables are discussed, it will be understood that table determiner 508 may query a database to determine the needed information without using a mapping table.

An interpolation engine 510 then uses the timing information to interpolate a skill level based on the determined mapping table. As discussed above, the times for different cars with respective skill levels in a mapping table 300 are used to interpolate a skill level for the friend. Once the skill level is determined, interpolation engine 510 outputs the skill level.

Figure 6:
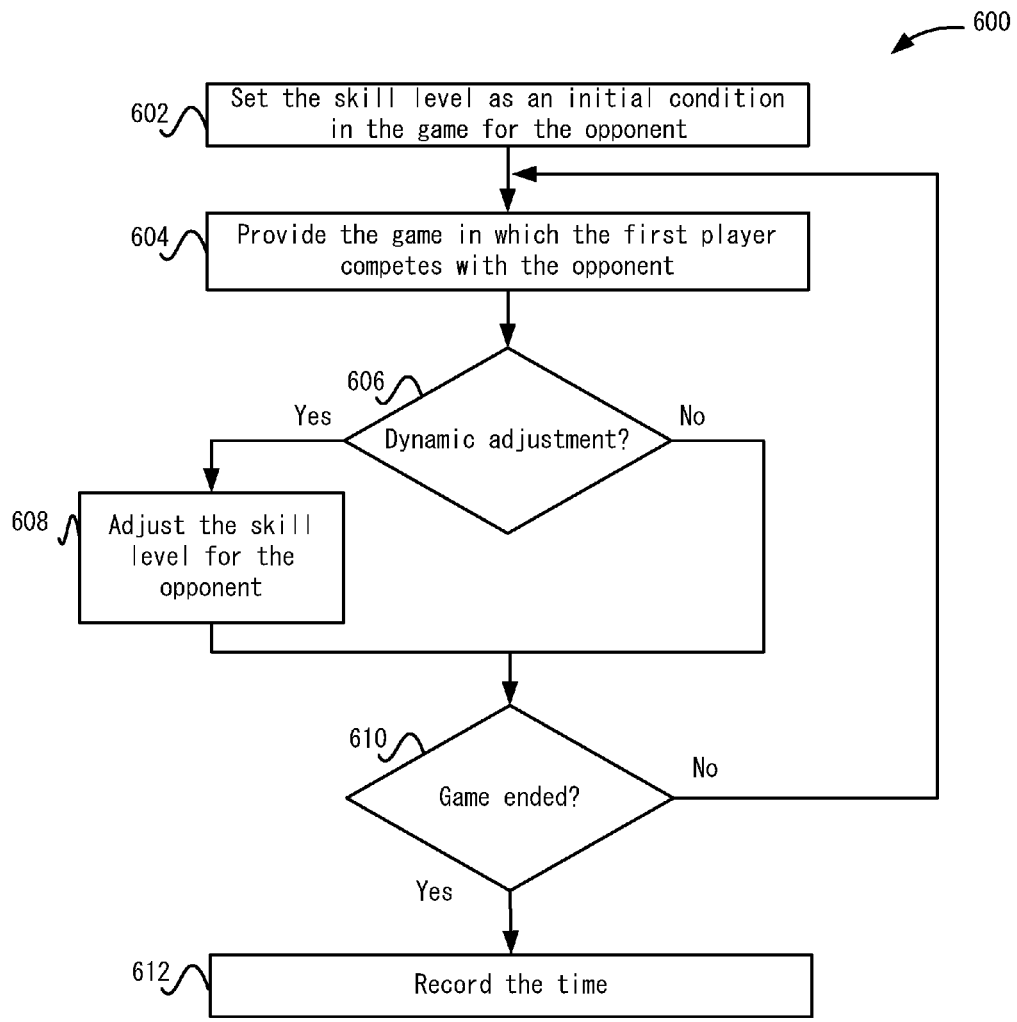
FIG. 6 depicts a simplified flowchart for providing a game according to one embodiment.

Once the skill level is determined, game controller 110 may provide the game using different methods. For example, game controller 110 may set the skill level as an initial condition for an opponent. Game controller 110 may then control the opponent based on the skill level, but game play may dictate what time the opponent receives in the event. In other embodiments, game controller 110 may set the skill level, but depending on game play, game controller 110 may dynamically adjust the skill level to cause the opponent to achieve the time that the friend received. FIG. 6 depicts a simplified flowchart 600 for providing a game according to one embodiment. At 602, game controller 110 sets the skill level as an initial condition in the game for the opponent. The initial condition is then used to control a car in a race.

At 604, game controller 110 provides the game in which the first player competes with the opponent. For example, the first player may be controlling a first car and the opponent is being automatically controlled in a second car based on the skill level that was set as an initial condition. During game play, certain random events may occur, such as the first player may run into the opponent, pass the opponent, etc. These events affect the play of the opponent. For example, if the opponent crashes, then the predicted time associated with the opponent in which the skill level was set may not be achievable.

At 606, game controller 110 determines if dynamic adjustment of the initial condition is configured. In some cases, game controller 110 is configured to let the aspects of game play dictate the time of the opponent. Thus, the opponent may not achieve the same time as the second player's time in this instance of the game. However, if dynamic adjustment is configured, at 608, game controller 110 may adjust the skill level for the opponent. For example, if game controller 110 determines that the opponent is behind the time achieved by the second player, then game controller 110 may increase the skill level. This causes the opponent to perform at a higher level and thus may cause the time to complete the event to decrease. Other methods of adjusting the opponent to achieve the predicted time may also be appreciated, such as game controller 110 may cause a car to have upgraded features, such as a higher top speed or acceleration during the race.

At 610, game controller 110 determines if the game has ended. If not, the process reiterates and the game continues to be provided and dynamic adjustment continues to be evaluated. At 612, if the game has ended, game controller 110 records the time.

In some cases, certain game types may not record a time. For instance, a game type may be an elimination mode, wherein players are eliminated every 20 seconds. In this case, the race time is fixed (e.g., 7×20 seconds), and thus comparisons on time may be compatible. In these scenarios, particular embodiments may estimate the skill that the second player played at for that specific event. This estimation is based on how the second player competed against opponents. For instance, if the second player was in an elimination type game against opponents with skill levels of 60, 61, 62, 63, and 64, and beat opponents with the skill levels of 60, 61, and 62, but not the opponents with the skill levels of 63 and 64, particular embodiments may estimate the second player's skill level for that particular instance of the event as 63. That is, the skill level is similar to the highest skill level of a beaten opponent and the lowest skill level of an opponent that beat the second player. Particular embodiments may also use interpolation if the second player beat all opponents by a large margin (e.g., the highest skilled opponent was skill 72 but the second player was half a lap ahead when winning so particular embodiments might estimate that the second player is skill 75 or higher rather than 73). Accordingly, timing information may be the skill levels of the opponents in the race and where the second player finished in the race. The skill level may be sent as timing information in this case. Time-shifted multiplayer engine 108 may then estimate the skill level based on the results of the last game.

Accordingly, particular embodiments provide a time-shifted multiplayer game. A friend may compete in a first game and achieve a time for completing an event. Later on, a second player may decide to compete in another event. To give the experience of a multiplayer game, an opponent is configured based on the friend's game and the first player competes against the opponent. This makes the game more interesting as the first player attempts to beat the opponent.

Figure 7:
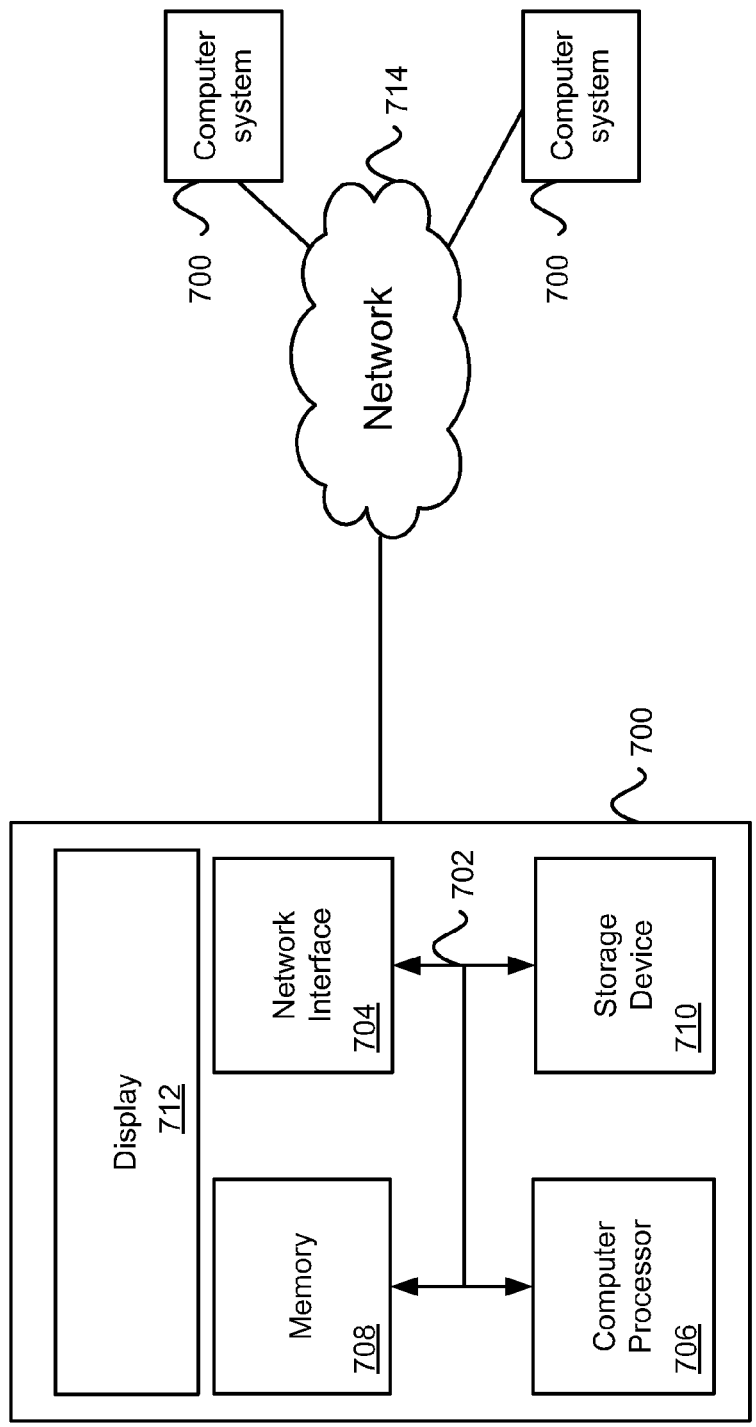
FIG. 7 illustrates an example of a special purpose computer system configured to provide a time-shifted multiplayer game according to one embodiment.

FIG. 7 illustrates an example of a special purpose computer system 700 configured to provide a time-shifted multiplayer game according to one embodiment. Computer system 700 includes a bus 702, network interface 704, a computer processor 706, a memory 708, a storage device 710, and a display 712.

Bus 702 may be a communication mechanism for communicating information. Computer processor 704 may execute computer programs stored in memory 708 or storage device 708. Any suitable programming language can be used to implement the routines of particular embodiments including C, C++, Java, assembly language, etc. Different programming techniques can be employed such as procedural or object oriented. The routines can execute on a single computer system 700 or multiple computer systems 700. Further, multiple processors 706 may be used.

Memory 708 may store instructions, such as source code or binary code, for performing the techniques described above. Memory 708 may also be used for storing variables or other intermediate information during execution of instructions to be executed by processor 706. Examples of memory 708 include random access memory (RAM), read only memory (ROM), or both.

Storage device 710 may also store instructions, such as source code or binary code, for performing the techniques described above. Storage device 710 may additionally store data used and manipulated by computer processor 706. For example, storage device 710 may be a database that is accessed by computer system 700. Other examples of storage device 710 include random access memory (RAM), read only memory (ROM), a hard drive, a magnetic disk, an optical disk, a CD-ROM, a DVD, a flash memory, a USB memory card, or any other medium from which a computer can read.

Memory 708 or storage device 710 may be an example of a non-transitory computer-readable storage medium for use by or in connection with computer system 700. The computer-readable storage medium contains instructions for controlling a computer system to be operable to perform functions described by particular embodiments. The instructions, when executed by one or more computer processors, may be operable to perform that which is described in particular embodiments.

Computer system 700 includes a display 712 for displaying information to a computer user. Display 712 may display a user interface used by a user to interact with computer system 700.

Computer system 700 also includes a network interface 704 to provide data communication connection over a network, such as a local area network (LAN) or wide area network (WAN). Wireless networks may also be used. In any such implementation, network interface 704 sends and receives electrical, electromagnetic, or optical signals that carry digital data streams representing various types of information.

Computer system 700 can send and receive information through network interface 704 across a network 714, which may be an Intranet or the Internet. Computer system 700 may interact with other computer systems 700 through network 714. In some examples, client-server communications occur through network 714. Also, implementations of particular embodiments may be distributed across computer systems 700 through network 714.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method of providing a game for a first player, the method comprising:

receiving, by a computing device, timing information for a second player that competed in a first instance of the game participated in by the second player, wherein the timing information is received based on the second player competing in a portion of the game, the portion comprising a subset of a completion of the game;

receiving, by a computing device, a skill level for the second player that competed in the first instance of the game participated in by the second player, wherein the skill level is based on characteristics of game play;

determining, by the computing device, a set of parameters for an artificial intelligence (AI) controlled opponent in a second instance of the game based on the timing information and the skill level, wherein the second player started competing in the first instance of the game before the second instance of the game is started;

creating, by the computing device, the AI controlled opponent based on the set of parameters for the second instance of the game; and providing, by the computing device, the second instance of the game in which the first player competes with the AI controlled opponent, wherein a performance of the AI controlled opponent is automatically controlled during the second instance of the game, wherein providing the second instance of the game comprises dynamically altering the set of parameters during game play of the second instance of the game to configure the AI controlled opponent to achieve a same time in the second instance of the game as that received by the second player in the first instance of the game.

2. The method of claim 1, wherein providing the second instance of the game comprises:

setting the set of parameters as an initial condition for the AI controlled opponent, wherein a time for the AI controlled opponent in the second instance of the game depends on game play of the second instance of the game.

3. The method of claim 2, wherein the time for the AI controlled opponent in the second instance of the game is different from the time received by the second player in the first instance of the game.

4. The method of claim 1, wherein determining the set of parameters comprises:
mapping the timing information for the second player to the skill level for the AI controlled opponent, wherein the skill level is based on a prediction that the AI controlled opponent will achieve a time received by the second player in the first instance of the game.

5. The method of claim 4, further comprising:
determining a performance level used in the first instance of the game by the second player; and
applying the performance level in the mapping to determine the skill level such that the AI controlled opponent is performing at a similar performance level used in the first instance of the game.

6. The method of claim 1, wherein determining the set of parameters comprises:
mapping skill levels in the timing information for a set of opponents in the first instance of the game to the skill level for the AI controlled opponent in the second instance of the game, wherein the skill level for the AI controlled opponent is based on a result of the first instance of the game between the set of opponents and the second player.

7. The method of claim 1, further comprising:
simulating a plurality of opponents in a simulated game to determine a plurality of predicted times for completing the game for the plurality of opponents, wherein each of the plurality of opponents is associated with a different set of parameters; and
determining the set of parameters for the AI controlled opponent in the second instance of the game using at least a portion of the set of parameters associated with the plurality of opponents and at least a portion of the plurality of predicted times.

8. The method of claim 7, wherein determining the set of parameters comprises:
determining one or more opponents in the plurality of opponents based on a comparison of the timing information for the second player and the predicted times for the one or more opponents; and
interpolating the skill level for the AI controlled opponent in the second instance of the game based on the predicted times and the skill levels for the one or more opponents and the timing information for the second player.

9. The method of claim 1, further comprising:
Receiving the characteristics of game play for the first instance of the first game; and
using the characteristics of game play to control the AI controlled opponent in the second instance of the game.

10. The method of claim 1, wherein:
the game comprises a car racing game,
the second player raced a first car in the first instance of the car racing game,
the first player is racing a second car in the second instance of the car racing game; and
the AI controlled opponent is racing a third car in the second instance of the car racing game.

11. A method of providing a racing game for a first player, the method comprising:
receiving, by a computing device, a second player's timing information for a race using a first racing entity in a first instance of the racing game participated in by the second player, wherein the timing information is received based on the second player competing in the portion of the racing game, the portion comprising a subset of the completion of the racing game;
mapping, by the computing device, the second player's time to the skill level for a second racing entity in a second instance of the racing game based on the characteristics of game play and a mapping table of skill levels to predicted times for the racing game for opponents in the racing game, wherein the first instance of the racing game is completed by the second player before the second instance of the racing game is started;
creating, by the computing device, the second racing entity for the second instance of the racing game based on the skill level, wherein creating comprises:
simulating a plurality of opponents in a simulated game to determine the predicted times for completing the racing game for the plurality of opponents, wherein each of the plurality of opponents is associated with a different skill level; and
determining a set of parameters for the second racing entity in the second instance of the game using the skill levels associated with the plurality of opponents and at least a portion of the predicted times for completing the racing game, wherein determining the set of parameters comprises:
determining one or more opponents in the plurality of opponents based on a comparison of the timing information for the second player's time and the predicted times for the one or more opponents; and
interpolating the skill level for the second racing entity in the second instance of the game based on the associated predicted times and skill levels for the one or more opponents and the second player's time; and
providing, by the computing device, the second instance of the racing game in which the first player races a third racing entity that competes with the second racing entity, wherein the second racing entity is automatically controlled in the second instance of the racing game by a game controller to perform according to the skill level, and wherein in providing the second instance of the game, the method further comprises dynamically altering the skill level of the second racing entity during game play of the second instance of the game such that the second racing entity achieves the second player's time in the second instance of the game.

12. The method of claim 11, wherein providing the second instance of the game comprises:
setting the skill level as an initial condition for the second racing entity, wherein the time for the second racing entity in the second instance of the game depends on game play of the second instance of the game.

13. The method of claim 12, wherein the time for the second racing entity in the second instance of the game is different from the second player's time in the first instance of the game.

* * * * *